April 22, 1941.  W. I. RILEY  2,239,117
BRAKE ACTUATING MECHANISM
Filed Nov. 16, 1939  2 Sheets-Sheet 1
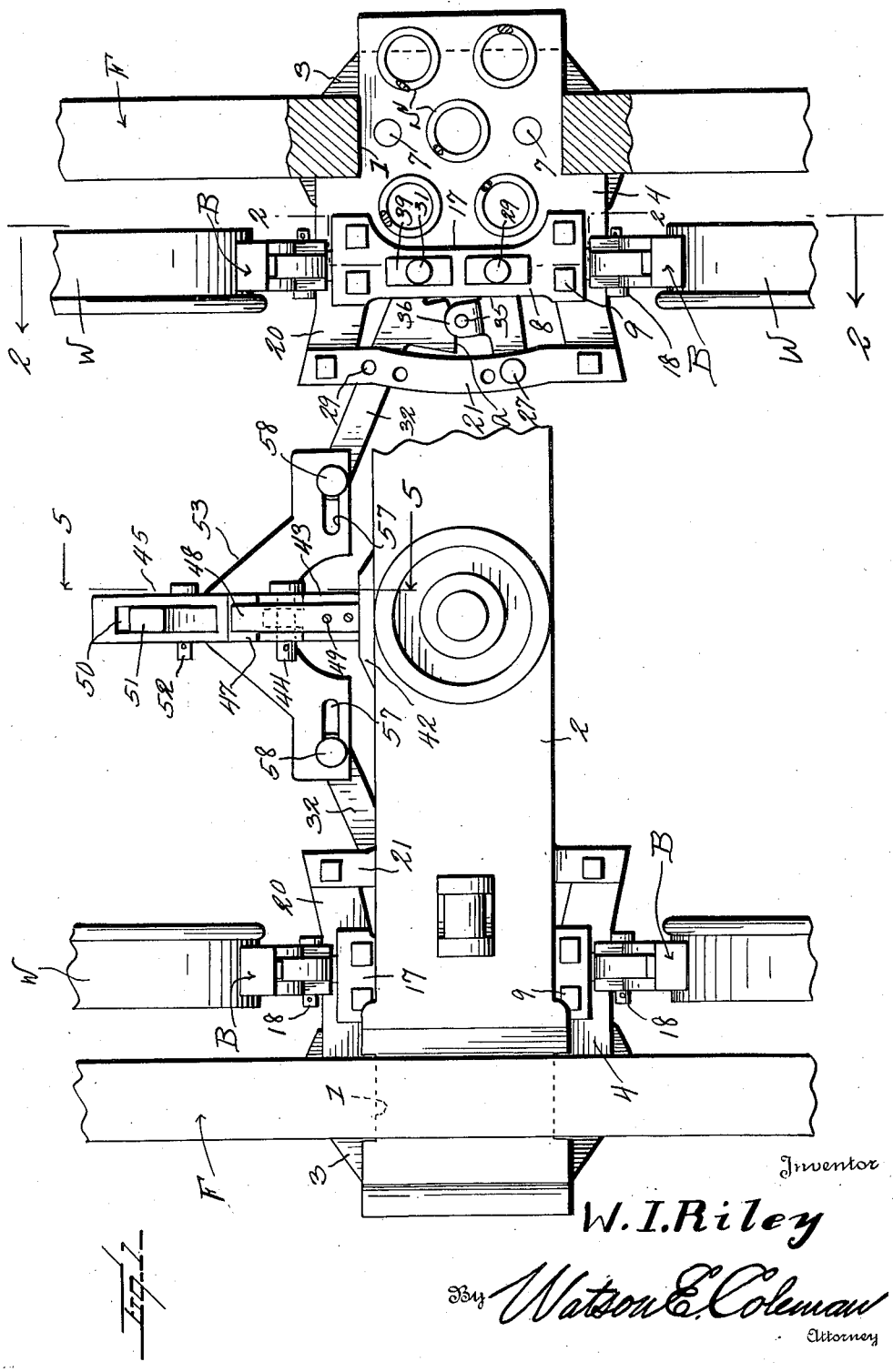
Inventor
W. I. Riley
By Watson E. Coleman
Attorney April 22, 1941. W. I. RILEY 2,239,117
BRAKE ACTUATING MECHANISM
Filed Nov. 16, 1939 2 Sheets-Sheet 2
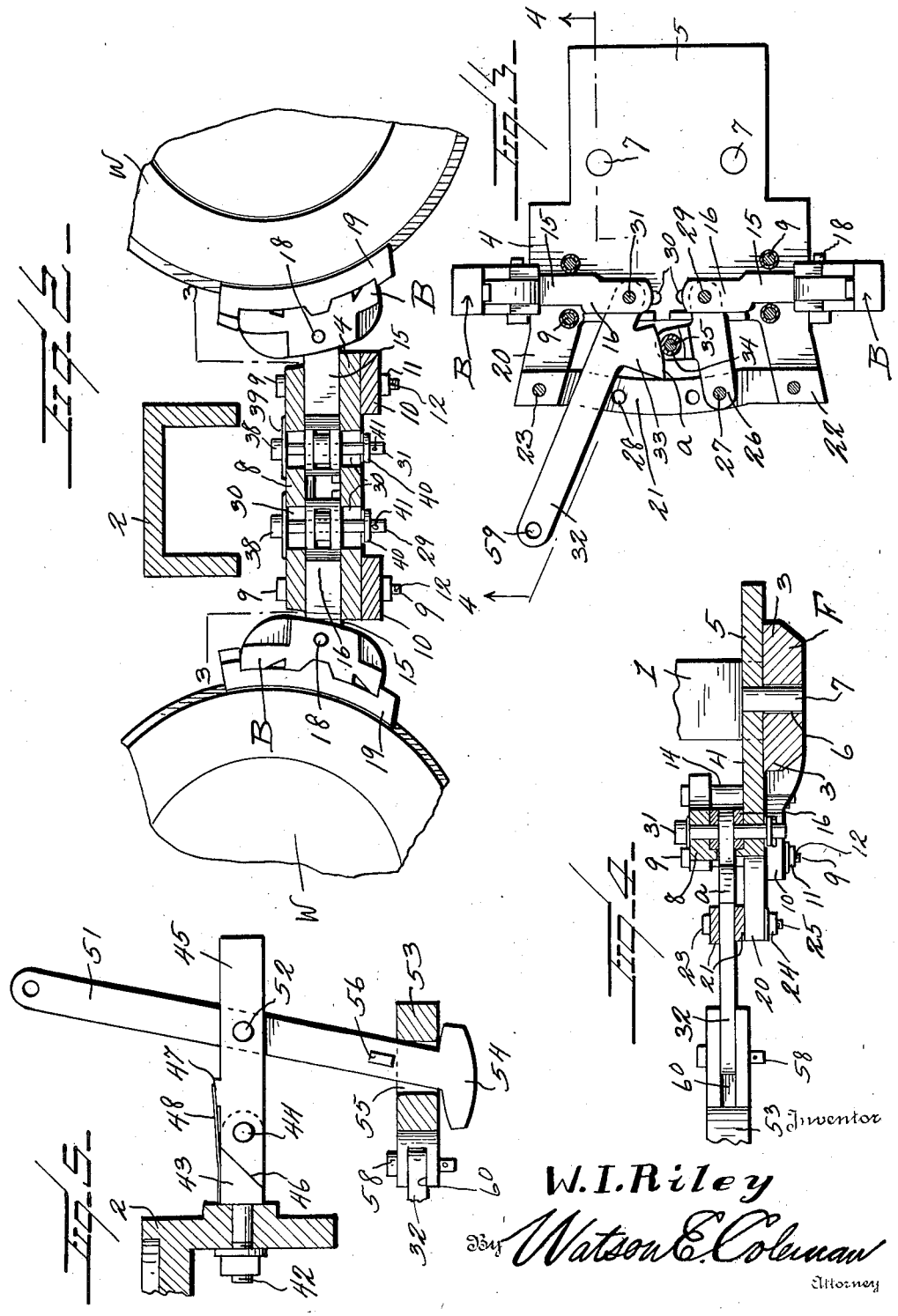
Inventor
W. I. Riley
By Watson E. Coleman
Attorney Patented Apr. 22, 1941

2,239,117

UNITED STATES PATENT OFFICE 2,239,117

BRAKE ACTUATING MECHANISM

William I. Riley, Trussville, Ala.

Application November 16, 1939, Serial No. 304,839

7 Claims. (Cl. 188—53)

This invention relates to a brake actuating mechanism and it is an improvement over the mechanism as particularly comprised in my Patent #2,102,222 which issued December 14, 1937.

It is an object of the present invention to provide a mechanism of this kind which operates in a manner to cause the brake shoes to have desired braking contact from one end to the other with the wheels to materially prolong the period of time in which said brake shoes may be used and also to minimize the liability of flattening of the wheels with which the shoes engage.

The invention consists in the details of construction and in the combination and arrangement of the several parts of my improved brake actuating mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a fragmentary view in top plan with portions broken away illustrating a brake actuating mechanism constructed in accordance with an embodiment of my invention and in applied or working position;

Figure 2 is a fragmentary detailed sectional view taken substantially on the line 2—2 of Figure 1;

Figure 3 is a view partly in top plan and partly in section of one of the braking units unapplied, the line of section being substantially on the line 3—3 of Figure 2;

Figure 4 is a sectional view taken substantially on the line 4—4 of Figure 3;

Figure 5 is a sectional view taken substantially on the line 5—5 of Figure 1.

As illustrated in the accompanying drawings, F denotes the side frames of a wheel truck for railroad rolling stock. Each of these frames is of a well known type and is provided in its central portion with a vertically disposed slot 1 of desired dimensions and in which is received an end portion of a connecting beam or plank 2 herein disclosed as of a channel type.

Each of the frames F at the bottom of the slot 1 therein is provided with the oppositely directed ledges 3 which in the use of my improved brake actuating mechanism provide a table for the usual spring S for supporting the adjacent end portion of the beam or plank 2. The frames F also rotatably support, as is well known, the track wheels W. As this mounting of the wheels W forms no part of the present invention a detailed description and illustration thereof is believed to be unnecessary.

Associated with each of the frames F is one of the units comprised in my improved actuating mechanism. In the present embodiment of the invention each of these units comprises a plate 4 of desired dimensions and which is provided at its rear margin with an extension plate 5 extending through the slot 1 of one of the frames F and rests upon the table as afforded by the bottom wall of said slot 1 and the associated ledges 3. The bottom wall of the slot 1 is provided therethrough with suitably spaced openings 6 in each of which is received a pin 7 depending from the extension plate 5. These pins 7 serve to maintain the plate 5 in desired position within the slot 1 and each of the pins 7 is held in its opening 6 under the action of the springs S which, in the embodiment of the invention as herein disclosed, has direct contact from above with the plate 4 and the extension plate 5.

The applied plate 4 extends between adjacent wheels W of the frame F. Overlying the outer longitudinal marginal portion of the plate 4 and positioned directly between the tread surfaces of the wheels W is a plate 8. This plate 8 is held in position by the threaded bolts 9 which are directed from above through the opposite end portions of this plate 8 and the adjacent end portions of the plate 4. These bolts 9 are also directed through the outwardly disposed arms 10 carried by the end portions of the inner ledge 3. The lower extremity of each of the bolts 9 has threaded thereon a holding nut 11 held against displacement by a cotter pin 12 or the like inserted through the bolt 9 below the nut.

The bolts 9 are surrounded by the spacing sleeves 14 interposed between the plates 8 and 4 whereby said plate 8 is maintained at a desired spaced point above the plate 4.

The bolts 9 are arranged in pairs at each side of the plate 4 or end portion of the plate 8 and the bolts of each pair are spaced apart a distance to readily permit sliding movement therebetween of a plunger 15. The inner portion 16 of each of the plungers 15 is outwardly offset to assure clearance with respect to the adjacent springs S and for which purpose the inner central marginal portion of the plate 8 is cut out, as at 17.

The outer end portion of each of the plungers 15 is pivotally connected by a pin 18 with a brake shoe B provided with a conventional removable wear block 19. The mounting of the block 19 together with the particular structure thereof as well as the shoe B form no part of the present invention.

The plate 4 at its opposite ends is provided with the outwardly directed arms 20 of desired length and the outer end portions of said arms 20 are connected by the superimposed spaced bars 21, the opposed faces of which are flat. Interposed between the extremities of the bars 21 are the spacing blocks 22 and directed thru said end portions of the bars 21, the blocks 22 and the outer end portions of the arms 20 are the holding bolts 23. These bolts 23, as herein disclosed, are inserted from above and the lower end portion of each of said bolts has engaged therewith a holding nut 24 held against displacement by a cotter pin 25 or the like directed thru the bolt 23 below the applied nut 24.

Extending between the bars 21 to one side of the center of the arms 20 is an end portion of a rigid link 26 having one end portion pivotally connected with the bars 21 by a pin 27 selectively disposed thru a pair of registering openings 28 in the bars 21 and thru said end portion of the link 26. This pin 27 extends inwardly toward the plate 4 and is of a length to have its inner portion extend between the plates 4 and 8 for pivotal connection by the pin 29 with the inner end portion of a plunger 15 or more particularly the offset portion 16 thereof. This pin 29 is of a length to extend through the slots 30 provided in the plates 4 and 8 and disposed lengthwise of the plate 8. This arrangement of the pin 29 with respect to the slots 30 assures the plunger 15 having the desired endwise movement and particularly when a brake application is being made.

The inner end portion of the second plunger 15 or the offset portion 16 thereof has pivotally connected therewith by the pin 31 the end portion of an elongated lever 32 which extends out between the bars 21 and terminates at a material distance therebeyond. This lever 32 closely adjacent to its inner or pivoted end is provided with a laterally directed cam lug or plate 33 disposed toward the link 26. The outer edge $a$ of this lug or plate 33 is rounded and has direct contact with a sleeve 34 mounted upon a pin 35 carried by and intersecting the space between the vertically spaced arms 36. These arms 36 are carried by the central portion of the link 26 and are disposed in a direction toward the lever 32 and more particularly the lug or plate 33 thereof.

The pin 31 hereinbefore referred to at its opposite end portions is disposed through the slots 37 in the plates 4 and 8 and also disposed lengthwise of the plate 8 and in longitudinal alignment with the slots 30. The coaction of the pin 31 with these slots 37 also assures desired endwise movement of the second plunger 15 at the time a brake application is made.

The pins 29 and 31 as herein disclosed are insertible from above and have the heads 38 at the upper ends thereof. Each of these pins 29 and 31 is provided immediately below its head 38 with a washer 39 of a size to close the adjacent slot 30 or 37 against foreign matter which might have a tendency to clog such slots and thus interfere with the effectiveness of the mechanism.

The lower portions of the pins 29 and 31 carry the washers 40 held in place by the cotter pins 41 or the like. These washers 40 together with the pins 41 provide means to maintain each of the pins in working position.

Suitably anchored, as at 42, to the central part of the beam or plank 2 is a block 43 with which is pivotally connected, as at 44, the inner end portion of an elongated arm 45. The arm 45 and the block 43 are provided with the coacting shoulders, as at 46, whereby is limited the downward swinging movement of the arm 45 with respect to the member or plank 2. The arm 45 slightly in advance of its pivotal mounting 44 is provided with an upstanding rib or flange 47 with which contacts from above the outer or free end portion of a flat spring 48. The opposite end portion of this spring 48 is suitably anchored, as at 49, to the top face of the block 43. This spring 48 serves to normally maintain the arm 45 at the limit of its downward swinging movement with respect to the block 43 or the beam or plank 2 yet will allow the arm 45 to have upward swinging movement against the tension of the spring 48 in order to compensate for unusual roughness in the trackway over which the rolling stock may be travelling. This arm 45 is provided therealong with a slot 50 through which is directed the vertically disposed or main operating lever 51. The central portion of this lever 51 is pivotally connected by the pin 52 with the arm 45 and the upper end portion of the lever 51 is to have connected therewith the brake rod or the like which may be actuated in any well known manner in an air brake system or from a hand wheel.

The lower portion of the lever 51 is freely and loosely directed through the central or apex portion of an equalizing member 53. The lower extremity of the lever 51 is provided with a head 54 of a size to prevent the lever 51 from being drawn up through the opening 55 in the equalizing member 53 through which the lower portion of the lever 51 is directed. This lever 51 above the member 53 and in close proximity thereto has disposed therethrough the pin 56. This pin 56 extends sufficiently beyond opposite sides of the lever 51 to have such contact from above with the equalizing member 53 to prevent the lever 51 falling or dropping through the opening 55.

The rear portion of the member 53 in the opposite extremities thereof is provided with the longitudinally disposed and aligned slots 57 through which are directed from above the pins 58 which are also disposed through the outer extremities of the levers 32 and for which purpose the outer or free end portion of each of the levers 32 is provided with an opening 59.

Each portion of the member 53 provided with a slot 57 has a kerf 60 in which the outer end portion of a lever 32 is received.

Upon proper pull being imposed through the lever 51 upon the equalizing member 53, the member 53 will be moved in a direction toward the beam or plank 2 with resultant movement of the levers 32 in a direction to cause the lugs or cam plates 33 to ride upon the rollers 34. This action will cause the links 26 and the lever 32 riding on the lug or plate 33 as a fulcrum to move the plungers 15 outwardly and bring the brake blocks 19 into effective contact with the wheels W and to maintain the braking surfaces of such blocks from end to end in contact with the wheels. This is important as even wearing of the blocks 19 is assured and thus materially prolonging the life of such blocks and at the same time liability of flattening the wheels W is materially lessened.

In order to compensate for the wear of the blocks 19, the pins 27 may be adjusted from one hole 28 to another. In the drawings the openings 28 are shown in series at opposite end portions of the bars 21. This is done so that the mounting of the links 26 and the levers 32 may be readily reversed if so desired.

It is also to be pointed out that the mounting of the parts as herein disclosed is such as to readily compensate or equalize for any slight inequalities which may occur in the application of the brake.

From the foregoing description it is thought to be obvious that a brake actuating mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with the side frames of a wheel truck, inwardly disposed plates carried by said frames and extending between adjacent wheels comprised in the truck, substantially aligned plungers carried by each of the plates, brake shoes carried by the plungers, a rigid link pivotally engaged with the plate and one of the plungers carried thereby, a lever having one end portion pivotally connected with the second plunger, a cam plate carried by the pivoted end portion of the lever disposed toward the rigid link, said link having a part contacted by the cam plate upon movement of the lever in one direction to force both of the plungers outwardly.

2. In combination with the side frames of a wheel truck, inwardly disposed plates carried by said frames and extending between adjacent wheels comprised in the truck, substantially aligned plungers carried by each of the plates, brake shoes carried by the plungers, a rigid link pivotally engaged with the plate and one of the plungers carried thereby, a lever having one end portion pivotally connected with the second plunger, a cam plate carried by the pivoted end portion of the lever disposed toward the rigid link, said link having a part contacted by the cam plate upon movement of the lever in one direction to force both of the plungers outwardly, the plate at the inner end portions of the plungers being provided with the aligned slots disposed in the same general direction as the plungers, the pivotal connections between the link and one of the plungers and the lever and a second plunger comprising pins having portions extended to be received in the slots to provide a guiding means for the rear portions of the plungers.

3. In combination with the side frames of a wheel truck, inwardly disposed plates carried by said frames and extending between adjacent wheels comprised in the truck, substantially aligned plungers carried by each of the plates, brake shoes carried by the plungers, a rigid link pivotally engaged with the plate and one of the plungers carried thereby, a lever having one end portion pivotally connected with the second plunger, a cam plate carried by the pivoted end portion of the lever disposed toward the rigid link, said link having a part contacted by the cam plate upon movement of the lever in one direction to force both of the plungers outwardly, the plate at the inner end portions of the plungers being provided with the aligned slots disposed in the same general direction as the plungers, the pivotal connections between the link and one of the plungers and the lever and a second plunger comprising pins having portions extended to be received in the slots to provide a guiding means for the rear portions of the plungers, and guiding means for the forward portions of the plungers.

4. In combination with the side frames of a wheel truck, inwardly disposed plates carried by said frames and extending between adjacent wheels comprised in the truck, substantially aligned plungers carried by each of the plates, brake shoes carried by the plungers, a rigid link pivotally engaged with the plate and one of the plungers carried thereby, a lever having one end portion pivotally connected with the second plunger, a cam plate carried by the pivoted end portion of the lever disposed toward the rigid link, said link having a part contacted by the cam plate upon movement of the lever in one direction to force both of the plungers outwardly, the plate at the inner end portions of the plungers being provided with the aligned slots disposed in the same general direction as the plungers, the pivotal connections between the link and one of the plungers and the lever and a second plunger comprising pins having portions extended to be received in the slots to provide a guiding means for the rear portions of the plungers, an elongated plate carried by the first named plate at points spaced from the first named plate, the inner portions of the plungers working between the first named plate and the elongated plate, said elongated plate being also provided with slots through which end portions of the pivot pins are directed.

5. In combination with the side frames of a wheel truck, inwardly disposed plates carried by said frames and extending between adjacent wheels comprised in the truck, substantially aligned plungers carried by each of the plates, brake shoes carried by the plungers, a rigid link pivotally engaged with the plate and one of the the plungers carried thereby, a lever having one end portion pivotally connected with the second plunger, a cam plate carried by the pivoted end portion of the lever disposed toward the rigid link, said link having a part contacted by the cam plate upon movement of the lever in one direction to force both of the plungers outwardly, the plate at the inner end portions of the plungers being provided with aligned slots disposed in the same general direction as the plungers, the pivotal connections between the link and one of the plungers and the lever and a second plunger comprising pins having portions extended to be received in the slots to provide a guiding means for the rear portions of the plungers, an elongated plate carried by the first named plate at points spaced from the first named plate, the inner portions of the plungers working between the first named plate and the elongated plate, said elongated plate being also provided with slots through which end portions of the pivot pins are directed, and washers carried by the pins, said washers providing means to close the slots against foreign matter.

6. In combination with the side frames of a wheel truck, inwardly disposed plates carried by said frames and extending between adjacent wheels comprised in the truck, outstanding arms carried by each of the plates at its opposite end portions, spaced bars connecting the outer extremities of said arms, substantially aligned plungers carried by the plate, brake shoes carried by the plungers, a rigid link having one end portion pivotally mounted between the spaced bars, the opposite end portion of the link being pivotally connected with one of the plungers, a lever pivotally connected to the second plunger, said lever being of a length to extend through the spaced bars to a point therebeyond, said lever and link having contacting parts whereby both of the plungers move outwardly to set the brake shoes upon movement of the lever in one direction, and means engaging the outer end portion of the lever for moving the same in a direction to set the brake shoes.

7. In combination with the side frames of a wheel truck having vertically disposed slots centrally thereof, a cross member having its extremities disposed through the slots of the side frames, plates at the lower ends of the slots, springs interposed between said plates and the extremities of the cross member, each of said plates being continued by an extension plate extending between adjacent wheels comprised in the truck, substantially aligned plungers carried by each of the plates, brake shoes carried by the plungers, levers coacting with the plungers of the plates to move the plungers outwardly to set the brake shoes, an equalizing member operatively engaged with the levers, an arm pivotally engaged with the cross member for swinging movement in a vertical direction, means for limiting the downward swinging movement of the arm, yielding means for normally maintaining said arm at the limit of its downward movement, a main operating lever pivotally carried by the arm, and an operative connection between said main operating lever and the equalizing member.

WILLIAM I. RILEY.